United States Patent [19]
Belicic

[11] 3,968,982
[45] July 13, 1976

[54] COAXIAL METALLURGICAL CONNECTION

[75] Inventor: Martin Belicic, Erlangen, Germany

[73] Assignee: Siemens Aktiengesellschaft, Munich, Germany

[22] Filed: Sept. 12, 1974

[21] Appl. No.: 505,248

[30] Foreign Application Priority Data
Sept. 19, 1973 Germany............................ 2347203

[52] U.S. Cl.................................. 285/287; 228/56; 285/422; 285/DIG. 6
[51] Int. Cl.² ......................................... F16L 13/00
[58] Field of Search ............ 285/21, 173, 287, 422, 285/DIG. 6, 424, 187, 322, 286; 29/500, 501, 483, 473.1; 228/56

[56] References Cited
UNITED STATES PATENTS 2,460,666   2/1949   Wurzburger........................ 285/21
2,633,374   3/1953   Boice................................ 285/287
3,372,464   3/1968   Vincent et al. ................... 29/473.1

FOREIGN PATENTS OR APPLICATIONS 1,675,295   11/1970   Germany........................... 285/287

Primary Examiner—Werner H. Schroeder
Assistant Examiner—Moshe I. Cohen
Attorney, Agent, or Firm—Kenyon & Kenyon Reilly Carr & Chapin

[57] ABSTRACT

For metallurgically joining together coaxial parts of materials with greatly different thermal expansion coefficients such as, for instance, tubes, the walls thereof are slit in the axial direction in the overlap area. The parts to be joined together are pushed together so that the slits are covered by the respective other part. In the joining process proper by soldering or welding, deformation of the slit component ends is prevented by auxiliary devices such as, for instance, rings.

1 Claim, 2 Drawing Figures

COAXIAL METALLURGICAL CONNECTION

BACKGROUND OF THE INVENTION

The present invention concerns a coaxial metallurgical connection between parts with greatly different thermal expansion coefficients.

The metallurgical joining together of coaxial parts such as, for instance, tubes, or bolts or rods with tubes, by means of welding or silver-soldering techniques, normally presents no difficulties. However, this is true only if the parts to be joined consist of the same materials, or at least of materials the thermal expansion coefficients of which are not very different. In those cases, however, where for technical or economic considerations tubes or other formed parts with greatly different thermal expansion coefficients are to be joined together in intimate contact, the problem exists that very great tension is produced in the zone of the joint if cyclic thermal stresses occur, and the joint therefore fractures and develops leaks. This danger exists particularly if numerous temperature cycles in the range of, for instance, 20° and 1000°C occur.

In a metallic connection of two tubes pushed over each other or a coaxial connection of a tube and a bolt, three-dimensional stress conditions occur in the zone of the joint in the case of temperature changes. The larger the difference between the thermal expansion coefficients of the two partners and the larger the difference between the instantaneous temperature and that temperature at which the stresses in the joint zone of the connection are a mimimum, the greater the stresses. These stresses occur in the axial and circumferential direction as shear stresses and in the radial direction as tensile or compression stresses. In heating up or cooling down, the direction of the stress is reversed. A joint zone is fractureprone particularly in the case that the force acting in the radial direction appears as a tension component. In those cases where the fracture elongation of the joint zone is smaller than the difference of the increase in diameter of the two partners of the connection, a crack occurs.

In all those cases where material partners with compatible thermal expansion coefficients are not expediently available, the problem therefore arises to find a design for the joint zone, in which the development of radial stresses is greatly reduced and which thereby becomes very largely insensitive to cyclic temperature stresses. Such a design should make possible here not only connections between metallic partners, but also between metallic and non-metallic, e.g. ceramic, partners.

SUMMARY OF THE INVENTION

The solution of this problem is to provide the outer part of the joint in the area of the joint with slits parallel to the axis, which are completely covered by the inner part.

The generation of radially acting stresses is therefore prevented by the fact that at least one component, and if possible, both components, are slit at least once, and better several times, in the zone of the joint. The length of the slit depends on the diameter of the parts to be joined as well as on their wall thickness. As a rule of thumb, one can therefore say that the length of the slit always corresponds approximately to the diameter of the work piece. The depth of the joint must here be large enough that the slits are mutually completely covered up. It is also important in this connection that the slits of the one component are always centered between the slits of the other component. The contact surfaces can be soldered or welded together in a manner known per se. A satisfactory connection is also achieved, however, if both components, e.g. tubes, are welded together along the slits of the outer tube and the upper segment edge. In that case, however, care must be taken that the slits of the outer tube are preserved in any event; i.e., they must be made correspondingly wide from the start.

As the components to be joined together have become so softly deformable by the slitting operation that deformation of the tube segments formed by the slits is possible in the heating-up process, care must be taken in the joining process proper that the mutual contact of the components to be joined is preserved. This can be accomplished, for instance, by slipped-over rings and using internal bolts or expansion mandrels. These parts must then be made of a material, of course, which does not make a metallurgical bond with the work piece in the joining process proper. This can be accomplished by artificially applied oxidation layers or other coatings.

BRIEF DESCRIPTION OF THE DRAWINGS

To further illustrate these solutions of the problems, reference is made to FIGS. 1 and 2.

DETAILED DESCRIPTION OF THE INVENTION

Figure 1:
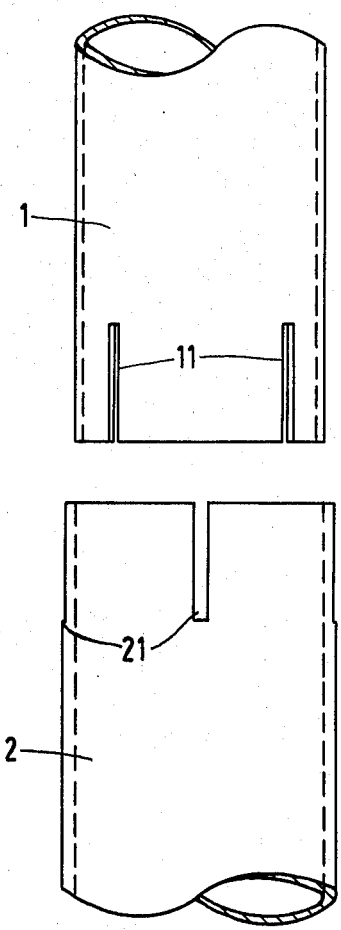
FIG. 1 shows two tubular components to be joined before they are put together.

According to FIG. 1, a component 1, e.g., of a niobium alloy, and the other component 2 of a chrome-nickel material, have substantially differeing thermal expansion coefficients. The thermal expansion coefficient of the material of component 1 is here $\alpha = 7.9 \times 10^{-6}$, and the expansion coefficient of the component 2 is $\alpha = 18 \times 10^{-6}$. The diameters of the components in the zone of the joint are about 28 mm and the wall thickness is about 1 mm. The slits 11 and 21 have a length of about 18 mm and a width of 1.5 mm.

Figure 2:
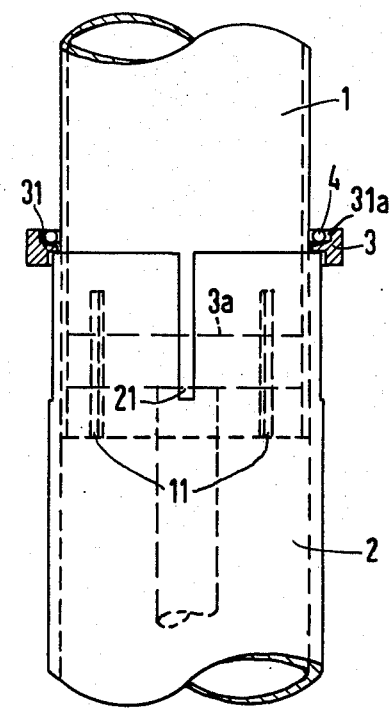
FIG. 2 shows the same components in the assembled condition, ready for silver soldering.

To make the connection between these two components, the latter are pushed into each other, see FIG. 2, and are held in this position by means (not shown). The slits 11 and 21 are completely closed here by the underlapping and overlapping of the slits by the unslit portion of the respective other component. In order to hold the outer component 2, a ring 3 is pushed over the edge of the former, which ring is held by an inward-projecting shoulder 31 above which an annular recess 31a is formed. This shoulder 31 may be serrated here, so that the wire solder ring 4 inserted in the recess 31a can easily flow in the silver-soldering operation, after melting, into the gap formed by the interface between the components 1 and 2. The solder material could be deposited, of course, also in the slits 11 or 21. In this example it is also advantageous to prevent the inner component 1 from being mechanically deformed by an inserted mandrel 3a. This mandrel may be made, for instance, of a ceramic material, so that there is no danger of it baking together with the joint parts. Metallic components can also be used, of course, which in the case of soldering are protected by an application of a stopping agent or a protective layer against wetting by the solder. In the material example selected, an alloy with a nickel base can, for instance, be used as the solder.

In experimental samples, the soldering took place in a high vacuum with a pressure of about $1 \times 10^{-4}$ mbar and a temperature of about 1120°C. Subsequently, the holding ring and the internal mandrel were removed. The soldered joint was then tested in a high vacuum in the range of 50° to 1000°C for resistance to temperature cycling, the heating to 1000°C taking place within 5 minutes, and the cooling to 50°C being completed after 10 minutes. The tightness of the joint gap was checked by means of a helium leak test; the helium leakage rate was extremely small and was less than $Q - 1 \times 10^{-9}$ mbar.dm$^3$.sec$^{-1}$ and had not changed after about 30 temperature cycles.

This principle can be applied, of course, not only to components with a circular cross section; it is rather also conceivable to join tubes of square cross section without stresses in this manner. Here, one will then locate the slits of the one component at the outer edge.

For connections between metallic and non-metallic, i.e., for instance, ceramic components or components of graphite, it is of course, necessary to perform the usual surface treatments, so that wetting by the solder becomes possible.

What is claimed is:

1. A joint comprising an inner part and an outer tubular part telescoped over said inner part and joined therewith by solidified molten metal, said parts having differing thermal expansion coefficients, both of said parts being tubes and each having a plurality of slots extending from their respective ends and parallel to their longitudinal axis and circumferentially interspaced with the slots of one part positioned centrally between the slots of the other part and covered by said other parts.

* * * * *